（12）United States Patent
Gupta

(10) Patent No.: US 12,504,131 B1
(45) Date of Patent: Dec. 23, 2025

(54) RESILIENT AND PORTABLE LIGHTBULB

(71) Applicant: ANTRISH, INC., San Diego, CA (US)

(72) Inventor: Ankit Gupta, San Diego, CA (US)

(73) Assignee: ANTRISH, INC., San Diego, CA (US)

( * ) Notice: Subject to any disclaimer, the term of this patent is extended or adjusted under 35 U.S.C. 154(b) by 0 days.

(21) Appl. No.: 19/047,017

(22) Filed: Feb. 6, 2025

Related U.S. Application Data

(63) Continuation-in-part of application No. 18/793,643, filed on Aug. 2, 2024.

(60) Provisional application No. 63/738,626, filed on Dec. 24, 2024.

(51) Int. Cl.
| | |
|---|---|
| F21K 9/238 | (2016.01) |
| F21K 9/232 | (2016.01) |
| F21V 23/00 | (2015.01) |
| F21V 23/04 | (2006.01) |
| F21Y 107/30 | (2016.01) |
| F21Y 115/10 | (2016.01) |
| H02J 9/06 | (2006.01) |
| H05B 47/14 | (2020.01) |
| H05B 47/17 | (2020.01) |

(52) U.S. Cl.
CPC ............ *F21K 9/238* (2016.08); *F21V 23/005* (2013.01); *F21V 23/0457* (2013.01); *F21V 23/0485* (2013.01); *H02J 9/065* (2013.01); *H05B 47/14* (2020.01); *H05B 47/172* (2024.01); *F21K 9/232* (2016.08); *F21Y 2107/30* (2016.08); *F21Y 2115/10* (2016.08)

(58) Field of Classification Search
CPC ........ F21K 9/238; F21K 9/232; F21V 23/005; F21V 23/0457; F21V 23/0485; H02J 9/065; H05B 47/14; H05B 47/172; F21Y 2107/30; F21Y 2115/10
See application file for complete search history.

(56) References Cited

U.S. PATENT DOCUMENTS

| | | | |
|---|---|---|---|
| 10,948,175 B2 * | 3/2021 | Chien ................. | F21V 33/0004 |
| 11,523,488 B1 * | 12/2022 | Recker ................ | H05B 47/105 |
| 2013/0051008 A1 * | 2/2013 | Shew ..................... | H02J 9/065 |
| | | | 362/235 |
| 2013/0076520 A1 * | 3/2013 | Kovacich ............. | G01R 19/155 |
| | | | 340/660 |
| 2017/0223807 A1 * | 8/2017 | Recker ............. | H02J 13/00006 |

* cited by examiner

*Primary Examiner* — Abdullah A Riyami
*Assistant Examiner* — Syed M Kaiser
(74) *Attorney, Agent, or Firm* — Jaquez Land Greenhaus & McFarland LLP; Bruce W. Greenhaus

(57) ABSTRACT

Various embodiments of a method and apparatus for providing light that is resilient to power outages are disclosed. The apparatus is a device that includes a primary light source, which includes an AC-to-DC converter that converts the AC power from a light socket to DC power. The device includes a secondary power source, as a backup, having an internal or external battery and a light source electrically connected in parallel. In some embodiments, the light source resides on a flexible, printed circuit board. In some embodiments, the device includes a sensor that senses the loss of AC power. In some embodiments, in response to the sensor sensing the loss of AC power, the light shuts off or fades out after a predetermined time period. In some embodiments, the user can stop the light from turning off or fading out by pressing a button.

15 Claims, 17 Drawing Sheets

RESILIENT AND PORTABLE LIGHTBULB

CROSS-REFERENCE TO RELATED APPLICATIONS

The present application is a Continuation-In-Part Application of U.S. patent application Ser. No. 18/793,643, filed Aug. 2, 2024, for a "Resilient and Portable Lightbulb," and claims priority benefit of U.S. Provisional Application No. 63/738,626, filed Dec. 24, 2024, which are each, herein, incorporated by reference in their entirety.

BACKGROUND

(1) Technical Field

The disclosed method and apparatus relate generally to systems for providing light. In particular, the disclosed method and apparatus relate to a portable lightbulb.

(2) Background

It is commonplace today to provide light using electric lightbulbs. Currently, the usage of lightbulbs is limited to fixed sockets. Lightbulbs rely on continuous power being supplied by the AC (Alternating Current) main lines for normal light operation. The bulb is functional as long as the socket has AC power. However, when there is a sudden power loss, a standard lightbulb turns off leading to darkness, and a search for alternative lighting methods, such as candles, torches, etc. The search for alternative lighting often happens in the dark, which exacerbates the problem and may lead to safety risks and frustration. In developing countries, there may be no proper alternatives to the lightbulb. Also, power loss is common in developing countries. Consequently, loss of power may lead to many nights spent in darkness waiting for the electric power to come back. Even when another light source is found, the light source is often inadequate. Also, every time someone needs to use the lightbulb outdoors, for example, for road construction or street vendors, long electrical wires are required, which can be a safety hazard. The electrical and wiring setup is needed even for a few nights of use, and it is time-consuming and expensive to set up the electrical wiring. Current LED (Light-emitting Diodes) lightbulbs are often illuminated in a manner that does not appear like, or are not as bright as, an iridescent or fluorescent lightbulb.

Accordingly, it would be advantageous to provide a lightbulb that plugs into a socket but stays lit even after the power is out.

SUMMARY

Various embodiments of a method and apparatus for lightbulbs that remain on during a power loss are disclosed. The lightbulb is portable and operates both with, and without, an external power source (e.g., an AC power source from a lightbulb socket).

In some embodiments, a system includes: (a) a lightbulb socket connector for connecting to an AC primary power source, where the AC primary power source is an external power source; (b) an alternating current (AC) to direct current (DC) converter having an AC end connected to the AC primary power source; (c) a light source having a high-voltage end connected to a DC end of the AC-to-DC converter; (d) a DC secondary power source, which is an internal power source having a battery charger connected to the DC end of the AC-to-DC converter; and (e) a battery chamber for holding batteries, being electrically connected to the battery charger and being connected electrically in parallel with the light source; the light source being powered primarily by the AC primary power source and secondarily by the DC secondary power source, wherein, (I) the light source is powered primarily by the AC primary power source when the AC primary power source is powered; and (II) the light source is powered by the DC secondary power source when the AC primary power source is not powered.

In some embodiments, the battery chamber accommodates the batteries, which supply a lower voltage than the DC end of the AC-to-DC converter, causing the light source to be primarily powered by the AC primary power source when the AC primary power source has power. In some embodiments, the system further includes (a) a sensor for sensing when the AC primary power source is not powered, by sensing that the lightbulb socket connector is not powered; and (b) a controlled switch in communication with the sensor that turns the light source off after a predetermined time after the sensor senses that the lightbulb socket connector is not powered. In some embodiments, the system further includes a manual switch connected to a sensor; wherein, when the manual switch is not activated, the sensor causes the light source to automatically turn off after a set time from when the AC primary power source loses power, and when the manual switch is activated, the sensor causes the light source to remain on. In some embodiments, the system further includes a light that provides a visual indication of whether the AC primary power source is powered. In some embodiments, the sensor includes a controller that, (a) determines whether the AC primary power source is powered, and (b) determines whether the manual switch is activated. In some embodiments, the system further includes a universal serial bus (USB), for in-processing, for powering the system. In some embodiments, the system further includes: a universal serial bus USB out-processing connected to the battery chamber, the USB out-processing provides power to an external device. In some embodiments, the light source includes a flexible material on which lights reside. In some embodiments, the flexible material is wrapped into a cylindrical shape. In some embodiments, the flexible material wraps around the battery chamber. In some embodiments, the flexible material is a printed circuit board. In some embodiments, the light source includes an array of light-emitting diodes. In some embodiments, the battery chamber is shaped to hold the batteries, which in some embodiments are cylindrical. In some embodiments, the system further includes a PCB, a hole being located in a center of the PCB, the light source having a cylindrical shape, the light source being positioned surrounding the battery chamber, with the PCB being positioned with the cylindrical shape protruding through the hole in the PCB.

In some embodiments, a system includes (a) a connector that connects to an external power source that is an AC primary power source; (b) an alternating current (AC) to direct current (DC) converter having an AC end connected to the connector; (c) a light source having a high-voltage end connected to a DC end of the AC-to-DC converter; (d) an internal power source that is a DC secondary power source, the DC secondary power source having a battery charger connected to the DC end of the AC-to-DC converter; and (e) a battery chamber for holding batteries, the battery chamber being electrically in parallel with the light source; the light source including at least an array of light-emitting devices on a flexible Printed Circuit Board (PCB), the flexible PCB being wrapped around the battery chamber.

In some embodiments, the battery chamber unit is external or physically separated from the main system and connected only electrically with wires.

In some embodiments, the battery chamber has a cylindrical shape. In some embodiments, the system further includes a main PCB, which supports circuitry, the circuitry including the AC-to-DC converter, the main PCB having a hole, and the main PCB being mounted in the system with the battery chamber protruding through the hole of the main PCB. In some embodiments, the light-emitting devices include a plurality of light-emitting diodes. In some embodiments, the system further includes a dome that scatters light, the light-emitting diodes being oriented facing walls of the dome.

In some embodiments, a method includes: (a) primarily powering a lightbulb by a lightbulb socket connector to an AC primary power source, where the AC primary power source is an external power source; (b) converting alternating current (AC) from the AC primary power source to direct current (DC), by an AC-to-DC converter having an AC end connected to the lightbulb socket connector; (c) generating light by a light source having a high-voltage end connected to a DC end of the AC-to-DC converter; (d) secondarily powering the light source by a DC secondary power source, which is an internal power source having a battery charger connected to the DC end of the AC-to-DC converter; and (e) charging batteries in a battery chamber by battery chargers, which are powered by the AC primary power source, the battery chamber being electrically in parallel with the light source; wherein, (i) when the AC primary power source is powered the light source is powered primarily by the AC primary power source and the batteries are charged; and (ii) when the AC primary power source is not powered the light source is powered by the DC secondary power source.

In some embodiments, a method includes: (a) converting, by an alternating current (AC)-to-direct current (DC) converter, alternating current from an AC primary power source to direct current, the AC primary power source being an external power source that provides AC power; (b) powering a light source primarily by the AC primary power source by direct current supplied by the AC-to-DC converter; (c) producing light by, the light source, having a high-voltage end connected to a DC end of the AC-to-DC converter; (d) charging, by a battery charger powered by the AC-to-DC converter, a DC secondary power source that is an internal power source having a battery; wherein the battery is electrically in parallel with the light source; and (e) in response to a loss of power from the AC primary power source, powering the light by the DC secondary power source.

In some embodiments, the lightbulb incorporates an internal power source (e.g., batteries), as a secondary source of power as a backup for the external power source. In some embodiments, circuits are provided for (1) an LED array and (2) smart switching between the internal power source and the external power source. In some embodiments, the outer shape and the quality of the light radiance of the lightbulb are similar to a standard lightbulb.

In some embodiments, the lightbulb includes (1) a connector shaped for mating with an AC socket that is external to the lightbulb, (2) a chamber for rechargeable batteries and (3) an array of LEDs (Light-emitting Diodes) or another light. The voltage drop between the external AC power source is higher than the voltage drop between the batteries and the ground (in other words, the batteries supply a lower voltage than the DC output of the AC-to-DC (Direct Current) converter). The batteries are arranged to be electrically in parallel to one another and connected with battery chargers. The AC-to-DC converter changes the AC voltage to a DC voltage for powering the LED array. The voltage drop from the output of the AC-to-DC converter is across batteries and the LED array, the LEDs are in parallel. The voltage drop of the batteries is across the LED array. Since the DC voltage originating from the external power source is higher, the power for the LED array is primarily provided by the DC output of the AC-to-DC converter (which in turn is powered by the AC power source). Also, when the AC power source is connected to the lightbulb, the AC power source charges the batteries (via the battery chargers). When the lightbulb is disconnected from the AC power source, the lightbulb stays lit, as a result of the batteries.

In some embodiments, the lightbulb includes a switch. When the AC power is disconnected, the light from the LED array fades. In some embodiments, by pressing the switch, the LED stays on or at least stays on longer.

In some embodiments, the LED array is supported on a flexible (or soft) PCB. In some embodiments, the circuit is also located on a flexible PCB.

In some embodiments, a timer causes the LED to fade when the AC power is disconnected. In some embodiments, the LEDs pulsate or blink when the AC power is disconnected.

In some embodiments, the bulb includes a USB (Universal Serial Bus) port to power the LED array and charge the battery. In some embodiments, the lightbulb includes a USB port that can be used to charge external devices (in addition to, or instead of, the USB port for powering the LED array).

In various embodiments, a system comprises (1) a primary power source, including an AC-to-DC converter that has the AC end connected to a lightbulb socket connector; (2) a light source that has a high-voltage end connected to a DC end of the AC-to-DC converter; (3) a light source, having a battery charger that is connected to the DC end of the AC-to-DC converter; and (4) a secondary power source having a battery chamber for holding the batteries, the battery chamber is electrically in parallel with the light source. The flexible PCB provides flexibility in the placement of the LEDs. In some embodiments, the LEDs are placed to face in multiple directions. Having the flexible LED mounted in a manner to surround the batteries, allows the lightbulb to hold more batteries, thereby providing more power, while maintaining (1) the outer structure of a standard lightbulb and (2) compatibility with a standard lightbulb socket.

In various embodiments, the light source includes a flexible material on which lights reside. In various embodiments, the flexible material is wrapped into a cylindrical shape. In various embodiments, the light source includes an array of light-emitting diodes. In various embodiments, a low-voltage end of the light source and a low-voltage end of the battery chamber are electrically connected. In various embodiments, the battery chamber accommodates batteries that produce a lower voltage than the high DC end of the AC-to-DC converter.

In various embodiments, the system further comprises (1) a sensor for sensing when the lightbulb socket connector disconnects from a power source; and (2) a switch in communication with the sensor that turns the light source off after a predetermined time from when the sensor senses that the lightbulb socket connector disconnected from the power source. In various embodiments, the lightbulb further comprises a universal serial bus (USB) connector for powering the system. In various embodiments, the USB comprises a USB out processing connected to a low-voltage end of the battery. In various embodiments, the USB comprises a USB in-processing connected to the DC high-voltage end of the AC-to-DC converter.

In various embodiments, a method is disclosed comprising: (1) converting, by an AC-to-DC converter, alternating current to direct current; (2) powering a light source by the direct current produced by the AC-to-DC converter; (3) producing light by, a light source, having a high-voltage end connected to a DC end of the AC-to-DC converter; and (4) charging, by a battery charger powered by the AC-to-DC converter, a battery; wherein the battery is electrically in parallel with the light source.

In the various embodiments, the method further comprises: upon losing power to a primary power source, the AC-to-DC converter automatically powering the light source with, a secondary power source, the battery. In various embodiments, the light source includes a flexible material on which lights reside. In various embodiments, the method further comprises illuminating a dome with the light source, the flexible material of the light source being wrapped into a cylindrical shape. In various embodiments, the light source includes an array of light-emitting diodes. In various embodiments, a low-voltage end of the light source and a low-voltage end of the battery chamber are electrically connected. In various embodiments, the battery chamber accommodates batteries that produce a lower voltage than the high DC end of the AC-to-DC converter. In various embodiments, the method further comprises: (1) sensing, by a sensor, when the lightbulb socket connector disconnects from a power source; and (2) after a predetermined time, turning the light source off, by a switch that is in communication with the sensor.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 15 illustrates a series of decisions determining whether the lightbulb is turned off or allowed to remain on.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

A lightbulb is disclosed that is powered by a lightbulb socket (a first power source or an AC primary power source) and that also includes a second power source or DC secondary power source. When the AC primary power source is powered, the AC primary source primarily powers the lightbulb. When the AC primary power source is not powered, the DC secondary source powers the lightbulb.

Figure 1:
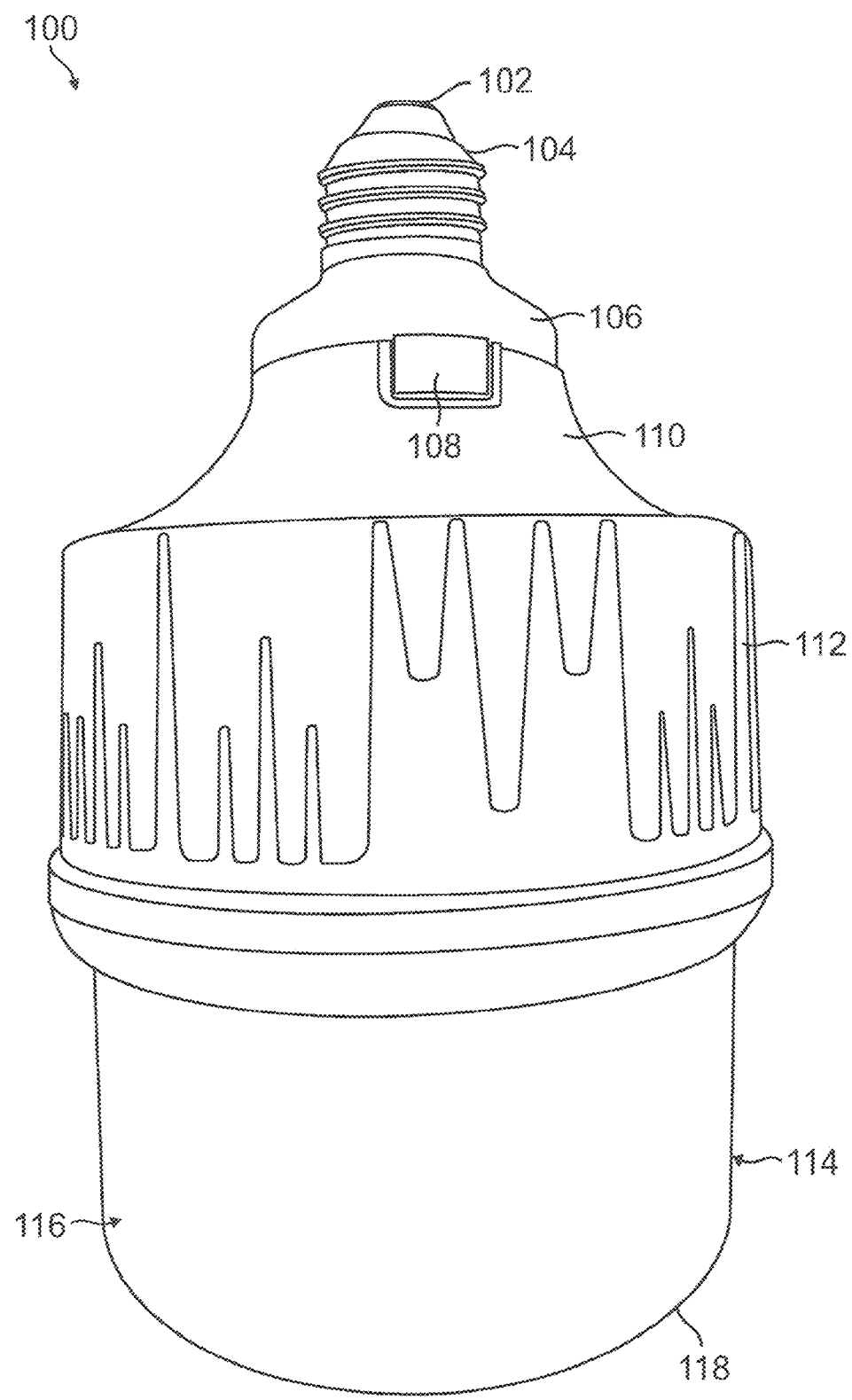
FIG. 1 illustrates various embodiments of the lightbulb.

FIG. 1 illustrates various embodiments of a lightbulb 100 (or a system). In some embodiments, the lightbulb 100 includes a first electrical connector 102 at an end of the neck of the lightbulb 100, and a second electrical connector 104 that wraps around the neck of the lightbulb 100. The second electrical connector 104 is threaded, which allows the lightbulb to screw into a lightbulb socket. A cone 106 is attached to the second electrical connector 104. A switch 108 can be activated, by being depressed, to release the cone 106 from the rest of the lightbulb 100, allowing the lightbulb 100 to open for removing or inserting batteries. The cone 106 is attached to a body 110 of the lightbulb 100. In other embodiments, a different set of connectors and differently shaped connectors are used for connecting to different types of lightbulb sockets.

The body 110 includes a grip 112 for grabbing and turning the body 110 of the lightbulb 100 when screwing or unscrewing the lightbulb 100 into a lightbulb socket or connecting the dome to the socket. The body 110 is attached to a dome 114, which lights up when the lightbulb 100 is turned on. The dome 114 includes cylindrical walls 116 and a top 118. Also, see FIG. 3, which has a grip 312.

Figure 2:
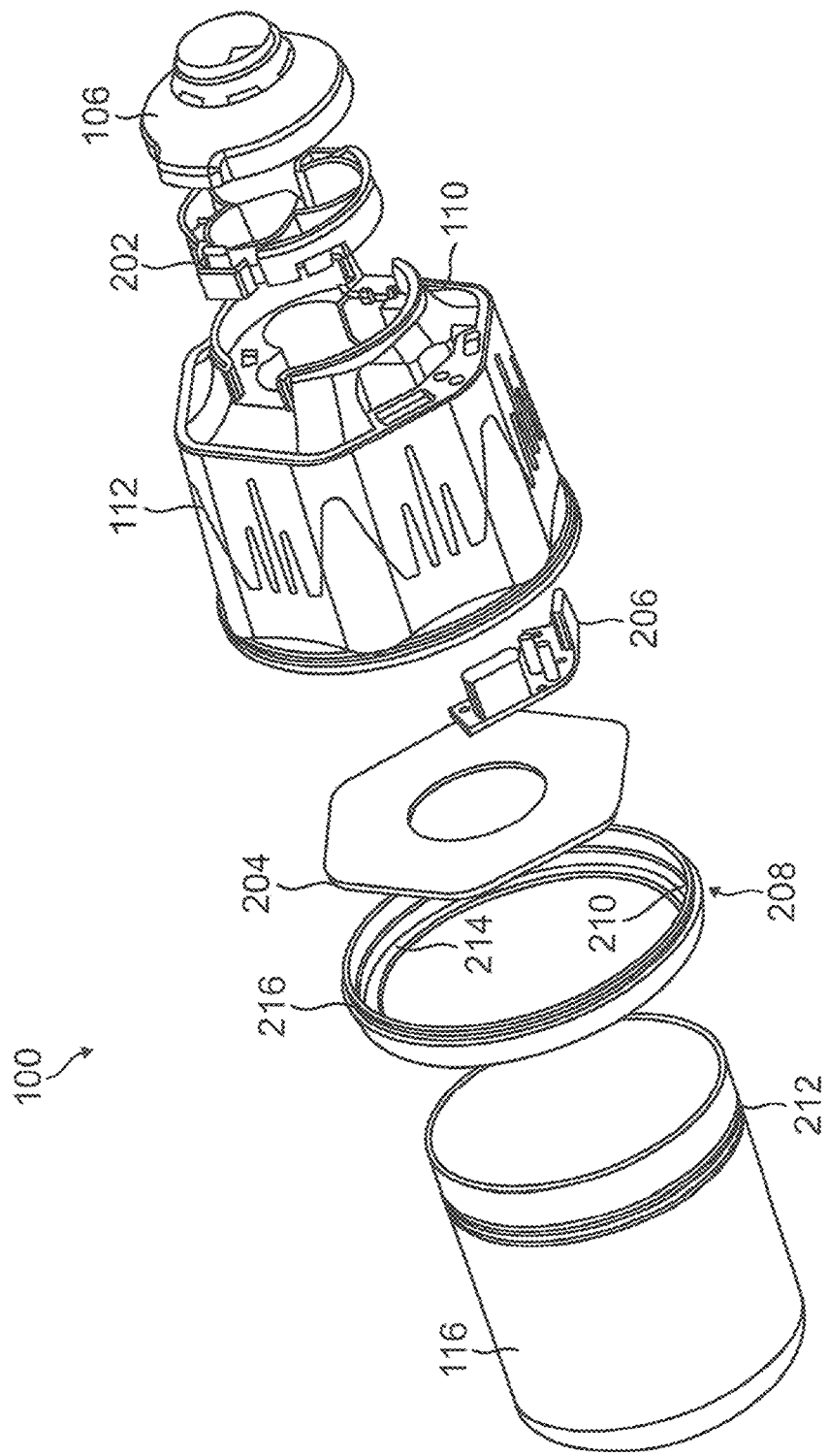
FIG. 2 illustrates an exploded view of various embodiments of the lightbulb.
Figure 3:
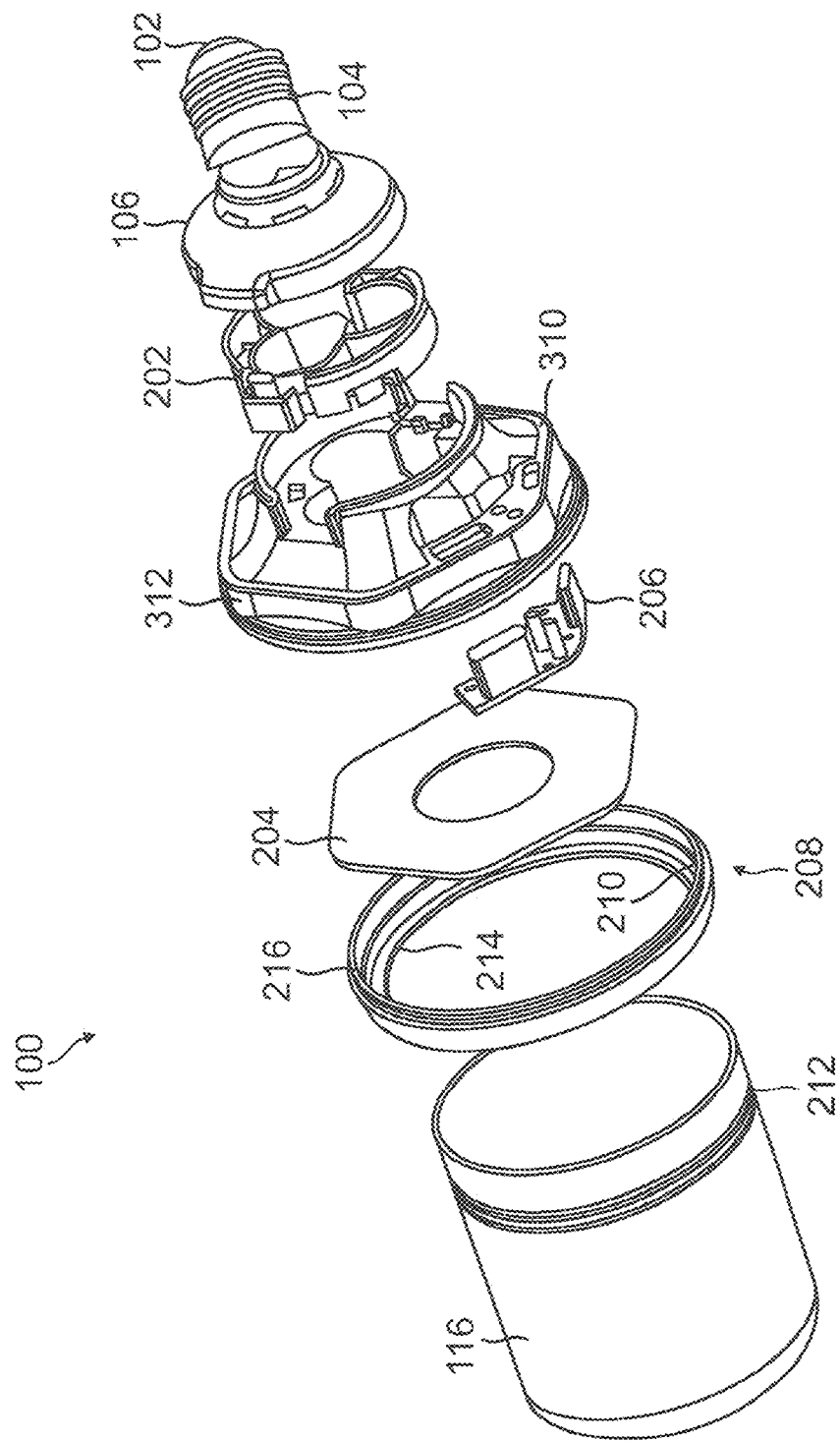
FIG. 3 illustrates an exploded view of various embodiments of the lightbulb.

FIGS. 2 and 3 illustrate an exploded view of various embodiments of the lightbulb 100. An inner collar 202 includes crevices and holes that mate with protrusions on a body 110 or 310 that keep the inner collar 202 from rotating or sliding. In some embodiments, the inner collar 202 includes protrusions that mate with crevices and holes on the body 110 and 310. The inner collar 202 is discussed further in conjunction with FIG. 3. A main PCB (Printed Circuit Board) 204 interacts with an element 206. The element 206 acts as a connector for USB connectors. In some embodiments, the element 206 includes protrusions that serve as buttons, which protrude through a shoulder of the body 110 or 310. In some embodiments, pressing on a different protrusion of the element 206 activates a switch by causing a different portion of the element 206 to place pressure upon the main PCB 204, closing a different electrical connection, depending on which protrusion is pushed. In some embodiments, pressing on one or more of the protrusions of the element 206 activates a switch by opening an electrical connection instead of closing the electrical connection.

The main PCB 204 can have any shape that fits within the body 110 or 310. In some embodiments, the main PCB 204 has a circular hole in the center of the main PCB 204, through which a battery chamber protrudes when the main PCB 204 is mounted on the lightbulb 100. In some embodiments, an outer shape of the main PCB 204 is hexagonal, and mates with a hexagonal depression in the body 110 or 310. In other embodiments, a different non-circular shape is used for the shape of the main PCB 204 instead of a hexagon. Using a noncircular shape for the main PCB 204 facilitates keeping the main PCB 204 from rotating after being installed/mounted.

An outer collar 208 holds the dome 114 on the body 110 or 310. The dome 114 is inserted through a wider opening 210 of the outer collar 208. In some embodiments, the dome 114 includes a ring 212 protruding from the sides of the dome 114. The ring 212 has a larger outer diameter than an inner diameter of a narrower opening 214 of the outer collar 208, which keeps the dome 114 from sliding completely through the outer collar 208. The outer collar 208 includes a rim 216 that mates with an opening in the body 110 or 310. An outer diameter of the rim 216 is smaller than the outer diameter of the outer collar 208. In some embodiments, the rim 216 is threaded with threads that match threads on the body 110 and 310, so that the outer collar 208 screws onto the body 110 or 310.

Figure 4:
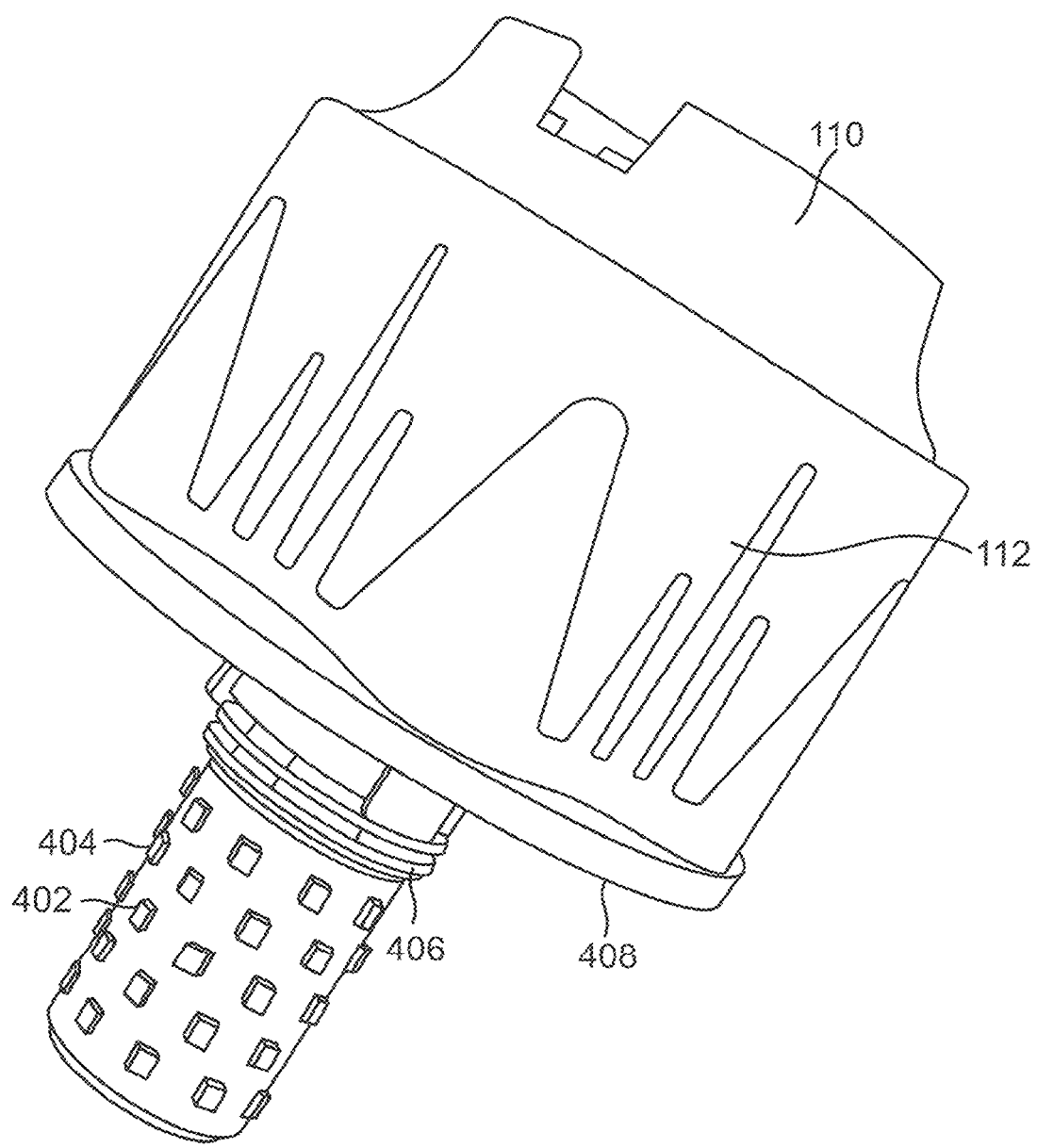
FIG. 4 illustrates various embodiments of the placement of a PCB on the lightbulb.
Figure 5:
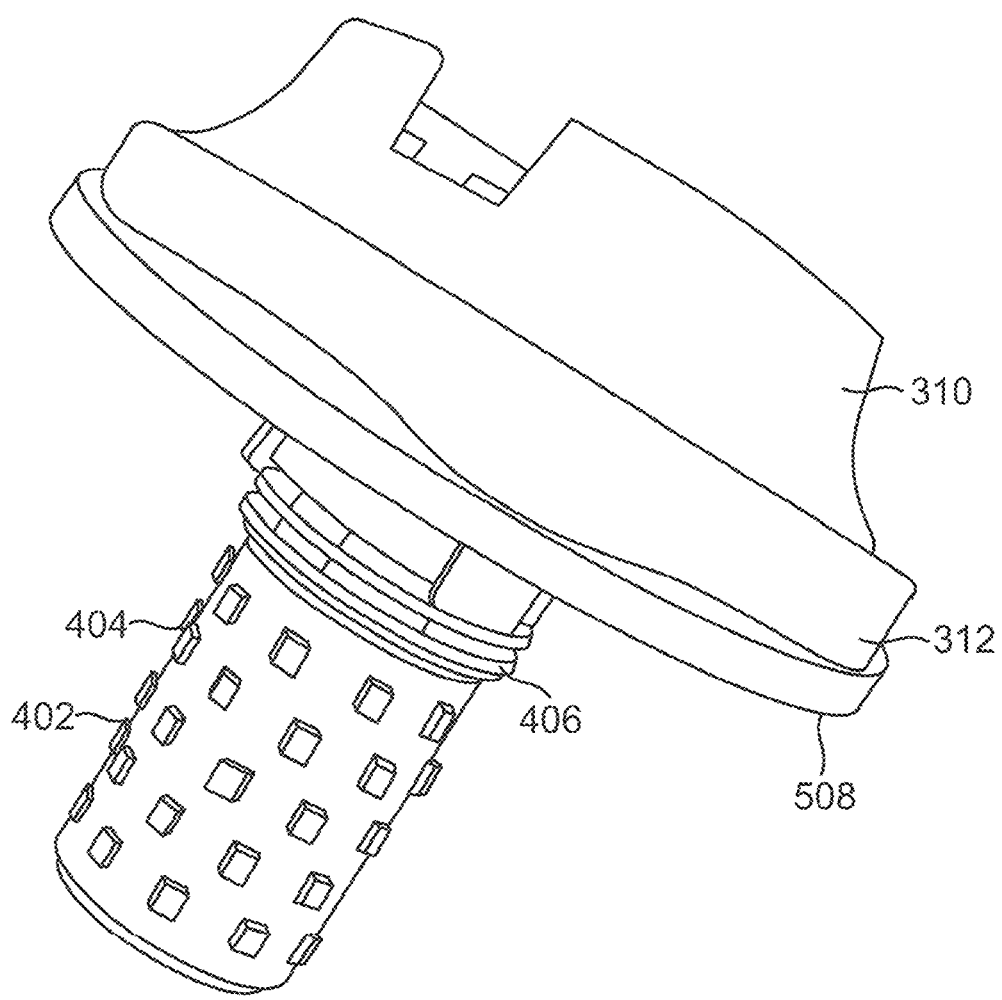
FIG. 5 illustrates various embodiments of the placement of a PCB on the lightbulb.

FIGS. 4 and 5 illustrate various embodiments of a flexible (or soft) PCB 402 carrying (and supporting) an LED array 404 (the LED array 404 resides, or is supported, on the flexible PCB 402). The flexible PCB 402 is made from a flexible/soft material. The flexible PCB 402 wraps onto an electrical connector 406 and around (and therefore surrounding) an interior of the battery chamber 806 (or battery holder, see FIG. 8), when mounted/positioned on the lightbulb 100, for powering the LED array 404. In the embodiments of FIGS. 2 and 4, having the interior of the battery chamber 806 extend into the dome 114, allows more batteries to be stored in the lightbulb 100, extending how long the lightbulb 100 can stay lit when powered by the DC secondary power source. Also, in the embodiments of FIGS. 3 and 5, having the interior of the battery chamber 806 extend into the dome 114, allows usage of the body 310 (instead of the body 110) allowing the lightbulb 100 to be more compact. The dome 114 scatters light from (and is illuminated by) the LED array 404 (and in that way the lightbulb 100 produces, generates or emits light). In some embodiments, an array of other light-emitting devices is used instead of the LED array 404. In various embodiments, the lightbulb 100 includes a flat surface 408 or 508, which is oriented parallel to the top 118. In some embodiments, the flexible PCB 402 can be configured and positioned to fit a contour of a shape of the outer shape of the battery chamber (see FIGS. 5 and 8 and their discussion below regarding the interior of the battery chamber 806 and its shape). Since the flexible PCB 402 can be rolled into different shapes, the LED array 404 can be oriented and positioned with the LEDs in different orientations, as needed. However, by placing the LEDs of the LED array 404 on the flexible PCB 402, with the flexible PCB cylindrically configured, the LEDs can be better placed/positioned, in a more compact manner and, to provide better illumination than on the flat surface 508. In some embodiments, LEDs are arranged on the flat surface 408 in addition to, or instead of, having the LED array 404 oriented parallel to (and facing) the cylindrical walls 116. In some embodiments, the cylindrical shape of the flexible PCB 402 has more room for LEDs than the flat surface 508. In some embodiments, the dome 114 has a different shape, and the flexible PCB 402 can be bent into other shapes to provide better illumination and keep the lightbulb 100 compact, depending on the shape of the dome 114.

Figure 6:
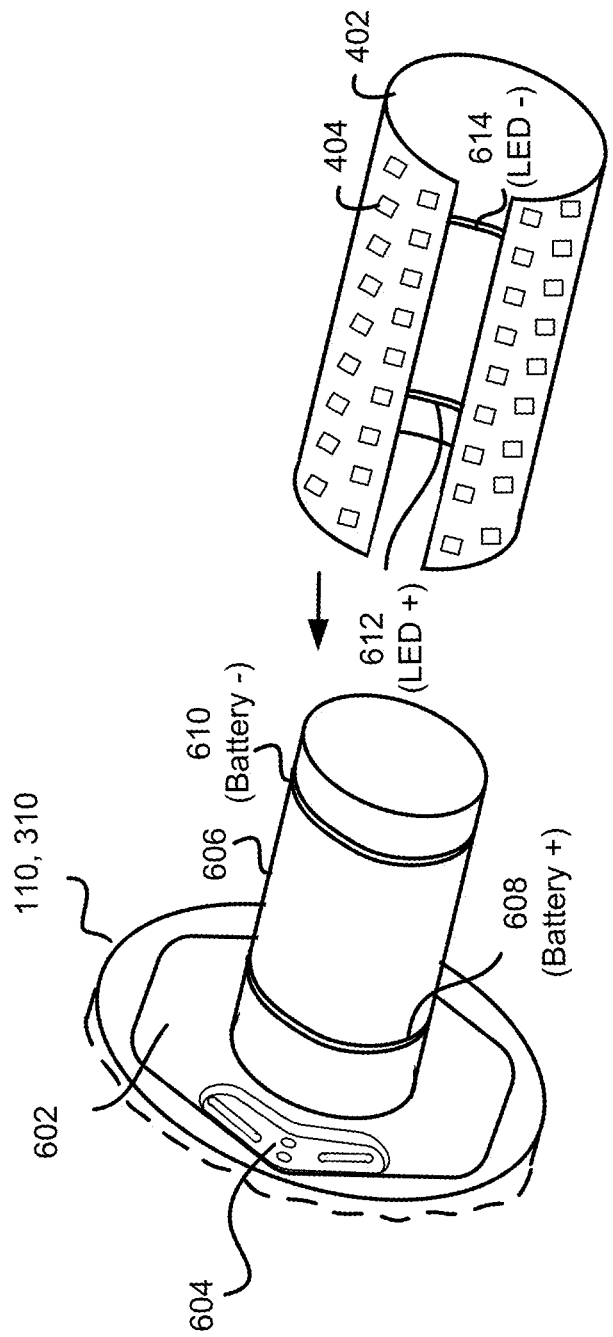
FIGS. 6 and 7 show the dome-side of the body of the embodiments of FIG. 3 or 5, but without the dome attached.
Figure 7:
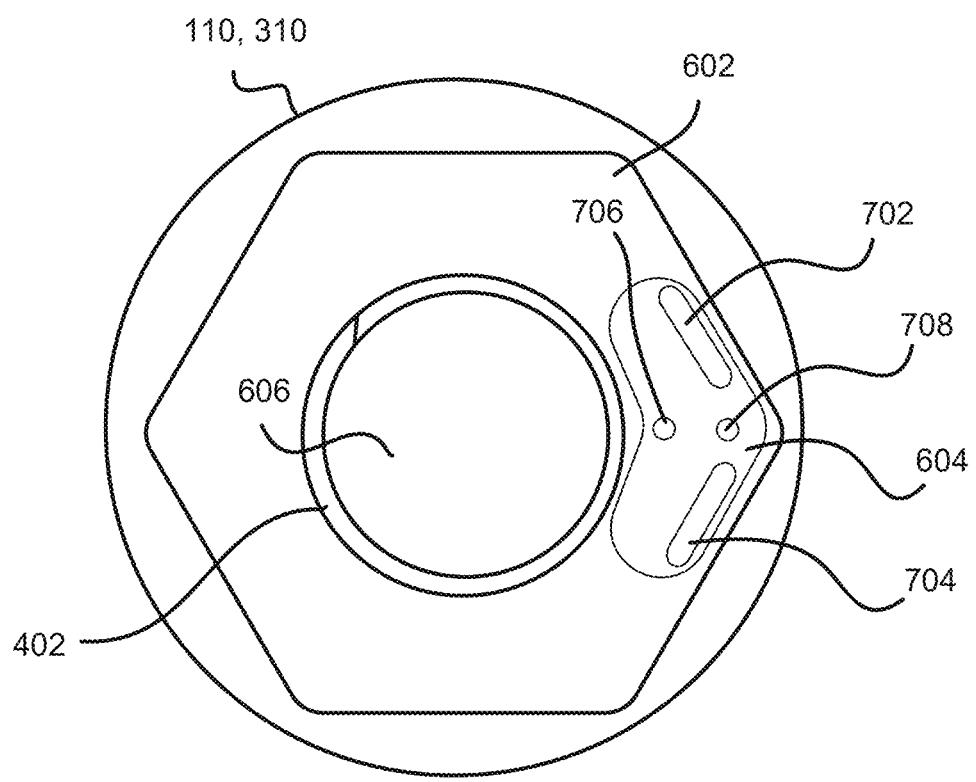

FIGS. 6 and 7 show the dome-side of the body 110 or 310 and related structure but with the dome 114 removed. The dome side of the body 110 or 310 includes a depression 602 (FIGS. 6 and 7) in which the main PCB 204 rests. The depression 602 includes a further depression 604 (FIGS. 6 and 7) for accepting the element 206. An exterior of a battery chamber 606 protrudes through the hole in the main PCB 204. The battery chamber 606 includes conductors 608 and 610 (FIG. 6), which connect to the positive end and negative end of the batteries in the battery chamber 606 (the conductor 608 is an embodiment/variation of the electrical conductor 406). The flexible PCB 402 includes conductors 612 and 614, which mate with the conductors 608 and 610, respectively. In embodiments, the conductors 608 and 610 and the conductors 612 and 614 have other configurations and shapes that mate with one another. The openings 702 and 704 accept USB connectors and the openings 706 and 708 (FIG. 7) are capable of accepting the protrusion of the element 206, which can act as buttons for controlling when the light bulb turns off or fades out. In some embodiments, the openings 702 and 704 accept a two-prong connector for powering the lightbulb 100. In some embodiments, the openings 706 and 708 accept USB connectors for powering the lightbulb 100.

Figure 8:
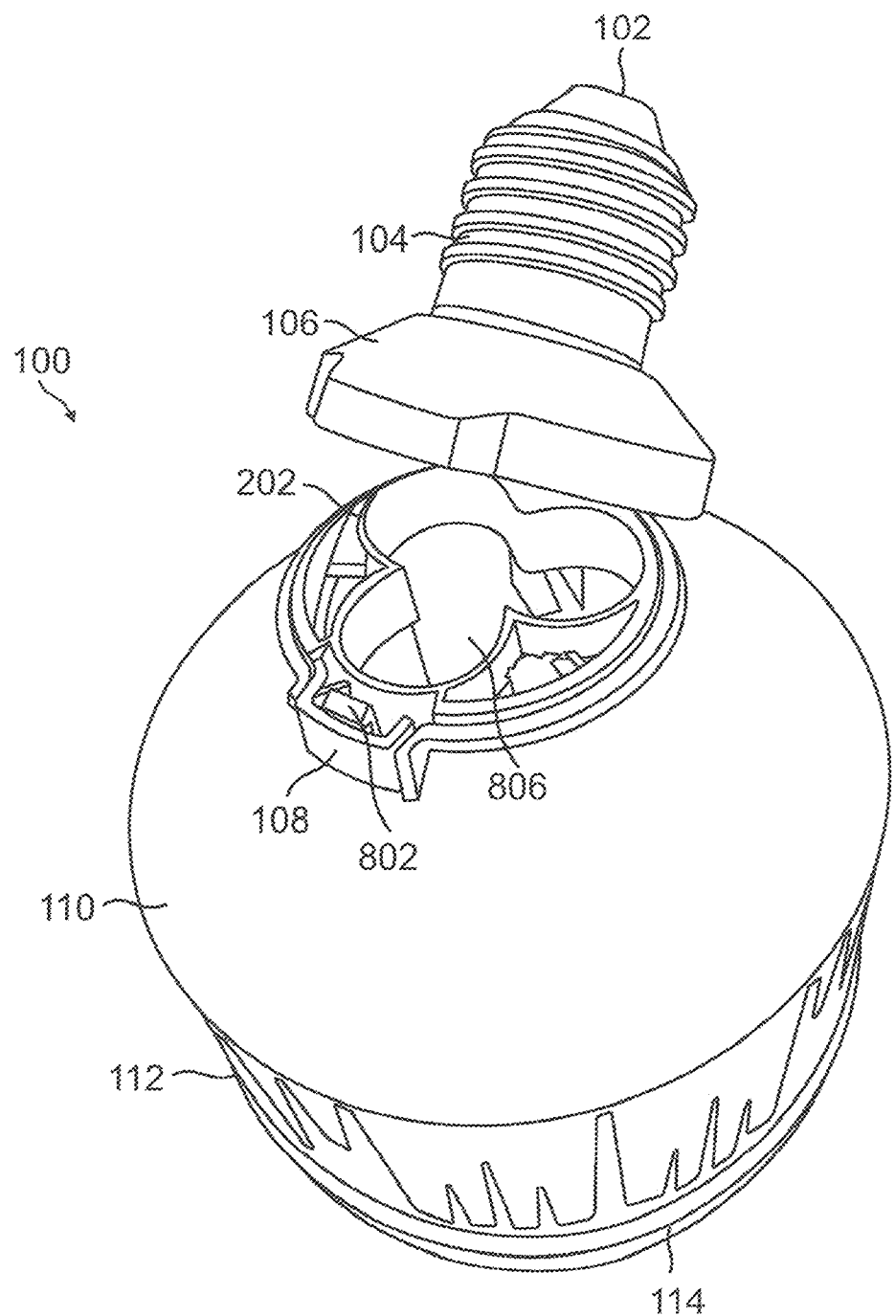
FIG. 8 illustrates various embodiments of a lightbulb and a chamber in the lightbulb for holding batteries.

FIG. 8 illustrates various embodiments of the lightbulb 100. In the embodiment of FIG. 8, the switch 108 includes a tab 802, which engages the cone 106 keeping the lightbulb 100 closed. In some embodiments, the switch 108 and the tab 802 are integral parts of the inner collar 202. In some embodiments, when the switch 108 is activated by being depressed, the inner collar 202 flexes, which causes the tab 802 to move inward releasing the cone 106. In some embodiments, even after being released, the cone 106 is held to the body 110 or 310 by a hinge, so that the cone 106 swings open when the switch 108 is depressed. In some embodiments, the hinge is a flexible piece of material. In some embodiments, the hinge is a flexible strip of plastic. In some embodiments, the hinge includes a bearing establishing an axis about which two pieces of material of the hinge rotate, one of the two pieces of the hinge is attached to the body 110 or 310, and another of the pieces of material of the hinge is attached to the cone 106. When the cone 106 swings open, the interior of the battery chamber 806 opens allowing batteries to be inserted into, or removed from, the interior of the battery chamber 806. In the embodiment of FIGS. 5 and 8, the interior of the interior of the battery chamber 806 (a battery chamber) includes three cylindrical columns for holding (or accommodating) batteries. In some embodiments, the interior of the battery chamber 806 holds three 18650 batteries. In some embodiments, the outer shape of the interior of the battery chamber 806 is cylindrical. In other embodiments, the interior of the battery chamber 806 has a different inner shape and accepts a different number of batteries and batteries of a different shape and type. In some embodiments, the interior of the battery chamber 806 has a different outer shape.

Figure 9:
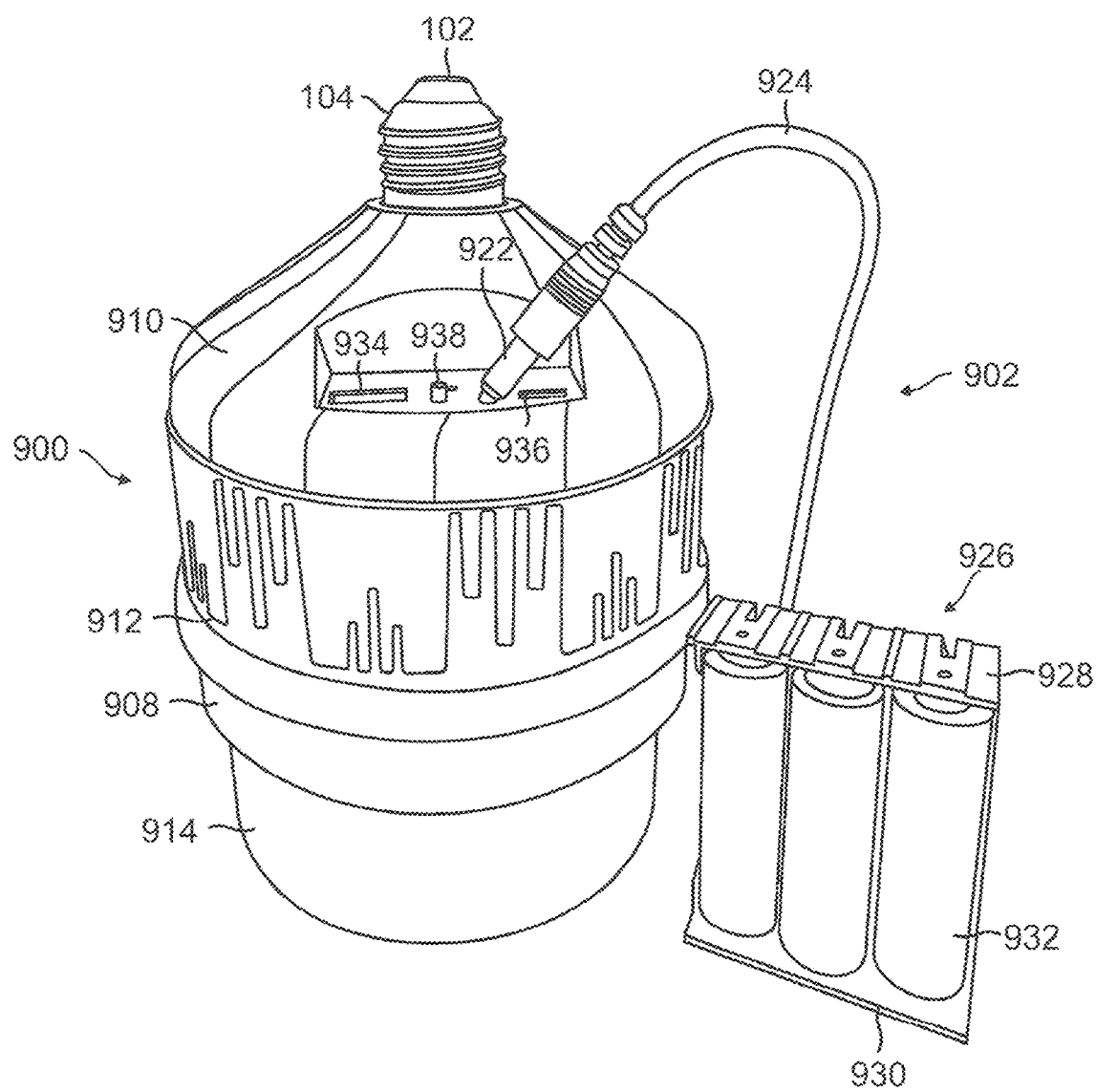
FIG. 9 illustrates the various embodiments of a lightbulb where the battery chamber is external to the bulb or system.

FIG. 9 illustrates the various embodiments of a lightbulb 900 where the battery holder 902 is external to the lightbulb 900 (or "lightbulb system" or "system"). In some embodiments, lightbulb 900 does not have an internal battery chamber. In some embodiments, lightbulb 900 has both an internal battery chamber and the battery holder 902. A connector 922 connects to a port in the lightbulb 900 to power the lightbulb. The lightbulb 900 is an embodiment of the lightbulb 100. The connector 922, connects, via the cord 924 to battery chamber 926 (or battery chamber) having contacts on the plates 928 and 930, to the positive terminals and negative terminals of the batteries 932. In the embodiment of FIG. 9, the battery chamber 900A includes contact for three 18650 cylindrical batteries. In some embodiments, the battery holder 926 provides a source of power in addition to the battery chamber 606. In some embodiments, the lightbulb 900 includes two USB connectors 934 and 936. The button 938, in some embodiments, when the power dies, when pressed stops the lightbulb from turning off. In other embodiments, the shape of the battery chamber can be a different shape and design and include fewer or more batteries, which can be of other types. In some embodiments, a collar 908, a body 910, a grip 912, a dome 914 and a collar 916 are similar or the same in structure and function as the outer collar 208, the body 110, the grip 112 and the dome 114, respectively, which were explained above. In some embodiments, the interior of the lightbulb 900 is the same as the lightbulb 100 or 300.

Figure 10:
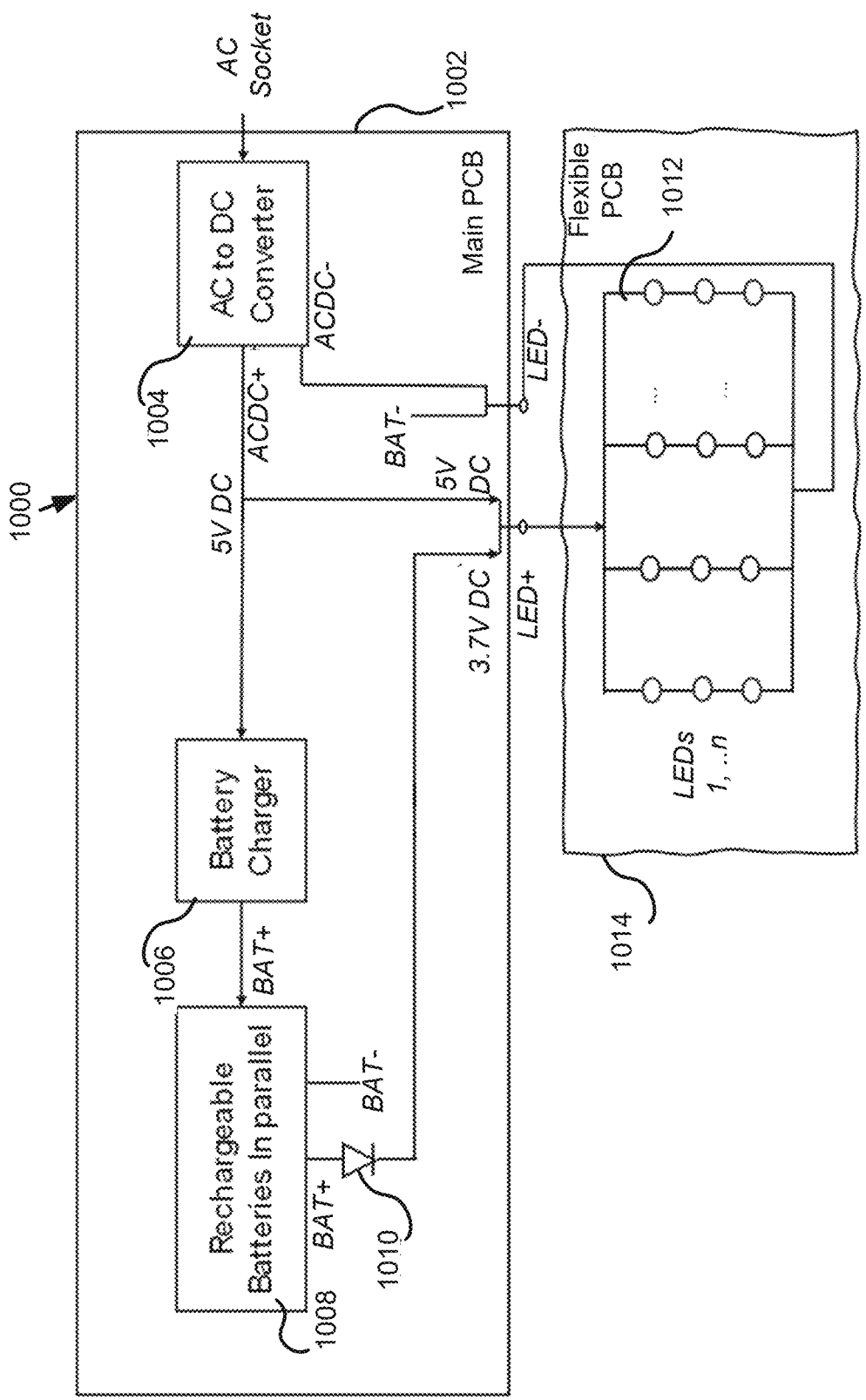
FIG. 10 illustrates various embodiments of a circuit for powering the LED array.

FIG. 10 illustrates various embodiments of a circuit 1000 (or circuitry) for powering the LED array 404. In some embodiments, part of the circuit 1000 rests on (or is supported by) a main PCB 1002, and the main PCB 1002 is an embodiment of the main PCB 204. In the embodiment of FIG. 10, an AC-to-DC voltage converter 1004 connects electrically to a lightbulb socket and converts AC electricity from the socket (and from the AC primary power source) to DC electricity for recharging batteries 1008 and powering the LEDs (the LEDs being primarily powered by the AC primary power source—the lightbulb socket). The DC end of the AC-to-DC voltage converter 1004 is electrically connected to at least one end of a battery charger 1006 to power the charging of the batteries 1008 (the batteries 1008 are rechargeable and are a DC secondary power source) and is also connected to an LED array 1012 (which is an embodiment of the LED array 404) for powering the LEDs of the LED array 1012. Another part of the battery charger 1006 is electrically connected to the batteries 1008. The batteries 1008 are charged in parallel with one another so that the batteries 1008 charge faster than had the batteries 1008 been charged in series. In some embodiments, the battery charger 1006 includes a separate battery charger for each battery. The high-voltage end of the batteries 1008 is connected to a diode 1010, which in turn is connected to the LED array 1012 so that the batteries 1008 power the LED array 1012. The diode 1010 protects the batteries 1008 from a current flowing into the high-voltage end of the batteries 1008 from the DC end of the AC-to-DC voltage converter 1004.

The batteries 1008 supply a voltage that is less than (or lower than) that supplied by the AC-to-DC voltage converter 1004 (so that when the AC primary power source is powered, the LED array 1012 is powered primarily by the AC primary power source). In some embodiments, the batteries 1008 supply 3.7 volts, and the DC end of the AC-to-DC converter supplies 5 volts (however in other embodiments, the voltage supplied by the batteries 1008 and the AC-to-DC voltage converter 1004 have different values). Although there are advantages to having the batteries 1008 supply a lower voltage than the DC end of the AC-to-DC voltage converter 1004, in some embodiments, the batteries 1008 and DC end of the AC-to-DC voltage converter 1004 supply the same voltage. The LED array 1012 is located on (or resides on) a flexible PCB 1014. The flexible PCB 1014 is an embodiment of the flexible PCB 402. The low-voltage end of the LED array 1012 is connected to the low-voltage end of the batteries 1008, which, in some embodiments, is connected to ground when the lightbulb is screwed into a lightbulb socket. Since (1) the high-voltage end of the batteries 1008, (2) the high-voltage end of the DC end of the AC-to-DC voltage converter 1004 and (3) the high-voltage end of the LED array 1012 is connected, the LED array 1012 and the batteries 1008 are connected in parallel, causing the batteries 1008 to charge while the LED array 1012 is lit when the AC socket connector is powered. Since the high-voltage end of the batteries 1008 is connected to the high-voltage end of the LED array 1012 when the AC-to-DC voltage converter 1004 is disconnected from the socket, the batteries 1008 automatically power the LED array 1012, keeping the LED array 1012 lit.

In some embodiments, when the socket connector is not powered, the lightbulb 100 dims informing the user that the power is out and the user should find an alternative source of light or power ready for when the batteries 1008 run out.

Figure 11:
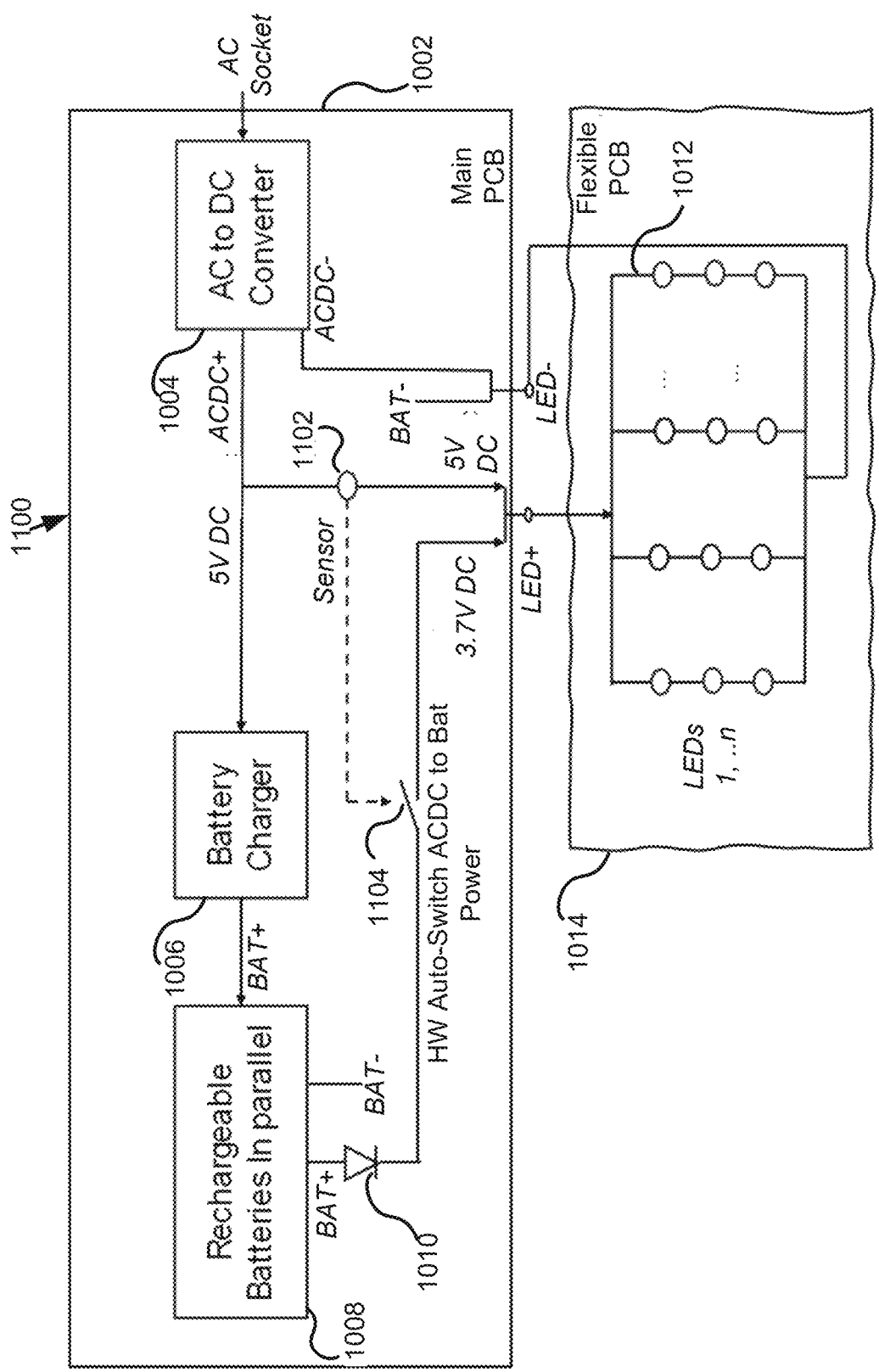
FIG. 11 illustrates various embodiments of a circuit for powering the LED array that includes a switch for keeping the LED array lit by the batteries.

FIG. 11 illustrates various embodiments of a circuit 1100 for powering the LED array 1012 for keeping the LED array 1012 lit by the batteries 1008, which includes a sensor 1102 and a switch 1104. The sensor 1102 senses whether power is being supplied to the AC-to-DC voltage converter 1004 and, in some embodiments, communicates with the switch 1104. For example, in some embodiments, when there is no AC power, there is also no current flowing to two pins of the sensor 1102 from the AC-to-DC voltage converter 1004. In some embodiments, the sensor 1102 senses whether there is a current from the DC end of the AC-to-DC voltage converter 1004 to the high-voltage end of the LED array 1012. In some embodiments, upon sensing that the socket is not powered (or that the power to the socket has died or senses a power loss), the sensor 1102 causes a timer to start. In some embodiments, after a predetermined time period (as determined by the timer), a signal is sent to open (or activate) the switch 1104, causing the LED array 1012 to shut off. In some embodiments, when the external power source is not available, the LED array 1012 fades out slowly or pulsates before shutting off. For example, the sensor 1102 generates pulses that power the LED array 1012. By modulating the duty cycle, the brightness of the LED array 1012 can be controlled. The ratio of the time that the LED array 1012 is on is decreased, to decrease the brightness of the LED array 1012 until the LED array 1012 fades out completely. Various embodiments of the sensor 1102 are discussed in conjunction with FIG. 14.

Figure 12:
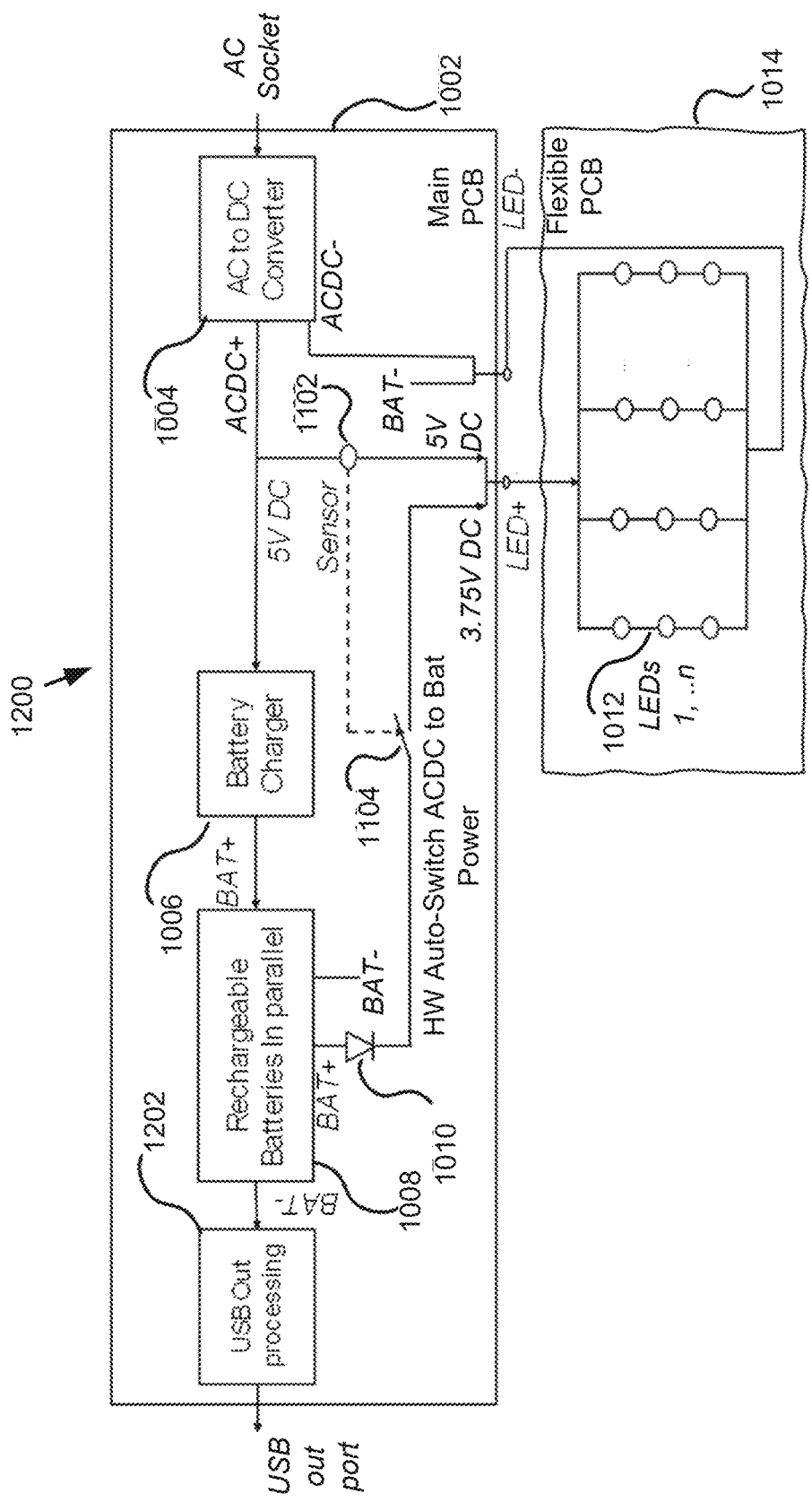
FIG. 12 illustrates various embodiments of a circuit for powering the LED array that includes a USB port for charging external devices.

FIG. 12 illustrates various embodiments of a circuit 1200 for powering the LED array 1012. The circuit 1200 also includes a USB out-processing 1202. The USB out-processing 1202 is a USB port that can be used for charging, or powering, other devices. For example, the user can use the USB out-processing 1202 for charging cell phones.

Figure 13:
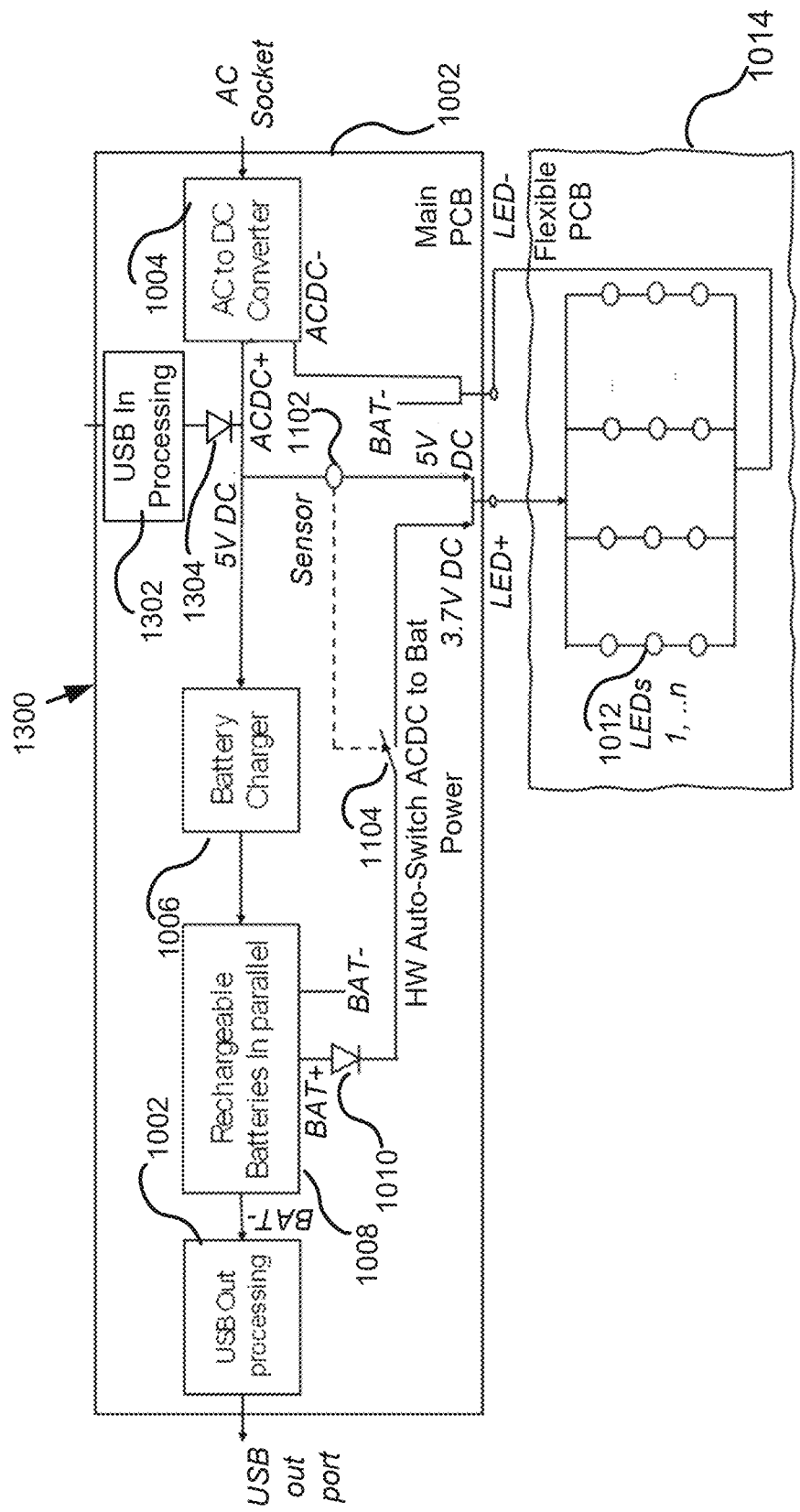
FIG. 13 illustrates various embodiments of a circuit for powering the LED array having a USB port for powering the LED array.

FIG. 13 illustrates various embodiments of a circuit 1300 for powering the LED array 1012. The circuit 1300 includes a USB in-processing 1302 and a diode 1304, via which the lightbulb 100 can be connected to an external DC power source to light the LED array 1012 and charge the batteries 1008. In some embodiments, the circuit 1300 does not have an external AC power source or the AC-to-DC voltage converter 1004. The diode 1304 protects USB in-processing 1302 from reverse currents.

Figure 14:
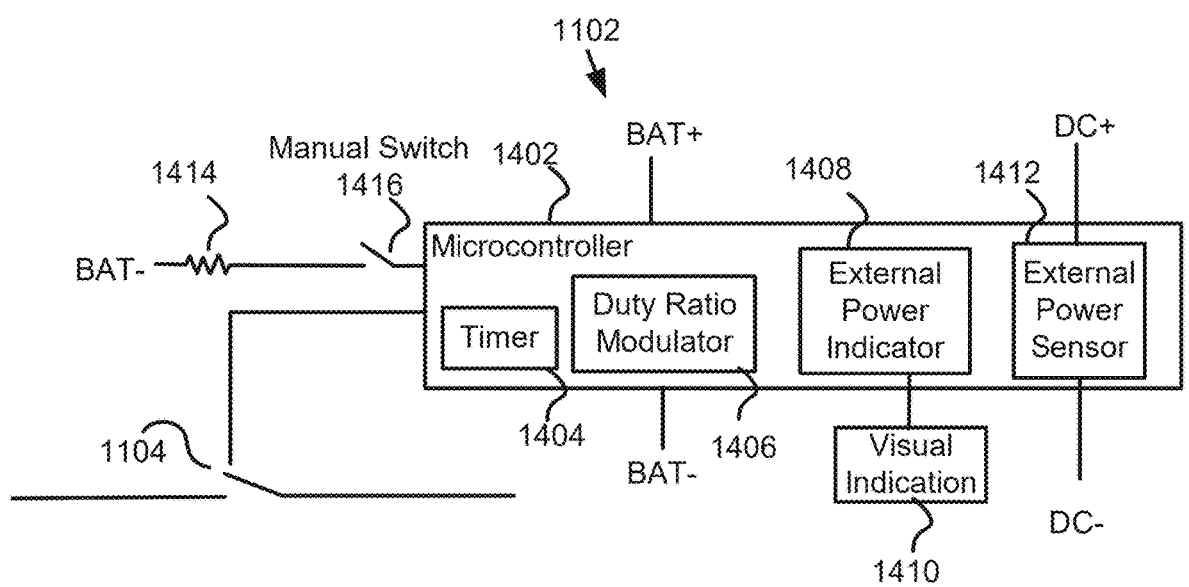
FIG. 14 illustrates various embodiments of the sensor of FIGS. 11-13.

FIG. 14 illustrates various embodiments of the sensor 1102. In FIG. 14, a microcontroller 1402 determines whether an external power source is connected. The microcontroller 1402 can be powered by the batteries 1008 (an internal power source), USB in-processing 1302 or an AC primary power source (or other external power source). Whether the microcontroller 1402 is powered by an external or internal power source depends on whether the external power source is connected. A timer 1404 determines how long after the external power source was disconnected (or no longer powered or died) to turn off the LED array 1012. A duty ratio modulator 1406 modulates the duty ratio of the power sent to the LED array 1012 to control the brightness of the LED array 1012, such as to cause the LED array 1012 to fade out. In some embodiments, the duty ratio modulator 1406 modulates a pulse width of the voltage powering the LED array 1012. In some embodiments, the duty ratio modulator 1406 is a frequency modulator, which modulates the time period between pulses. In some embodiments, an external power indicator 1408 includes machine instructions that cause a signal to be sent to a visual indicator 1410 to create a visual indication of whether the external power source is connected. In some embodiments, the visual indicator 1410 is a colored LED. In some embodiments, the visual indicator 1410 includes multiple visual indicators/LEDs, each indicating a different status of the lightbulb 100. For example, in some embodiments, one visual indicator indicates that the external power source is disconnected, and another visual indicator indicates that the lightbulb 100 is about to fade out. In some embodiments, a different color is used to indicate a different state. An external power sensor 1412 detects whether the external power is connected. In some embodiments, the external power sensor 1412 is a voltage sensor, which detects whether there is a voltage drop across a DC output of the AC-to-DC voltage converter 1004. In some embodiments, the external power sensor 1412 is a current sensor, whether there is a current from the high end to the low end of the DC output of the AC-to-DC voltage converter 1004. A manual override switch 1416 (or a manual switch), when activated, overrides the instructions that cause the microcontroller 1402 to turn off the LED array 1012. In some embodiments, the logic implemented by the microcontroller 1402 is stored in the firmware of the microcontroller 1402, which includes the duty ratio modulator 1406, and the external power indicator 1408. The microcontroller 1402 uses IO (input-output) pins to detect the states of signals (e.g., to control the duty ratio modulator 1406 and the external power indicator 1408) and provide output signals to switch and control the power sources. A resistor 1414 protects the microcontroller 1402 from damage when the manual override switch 1416 is closed (or activated). In some embodiments switches 1104 and 1416 can be manually toggled between states by buttons on element 206 and button 838.

Figure 15:
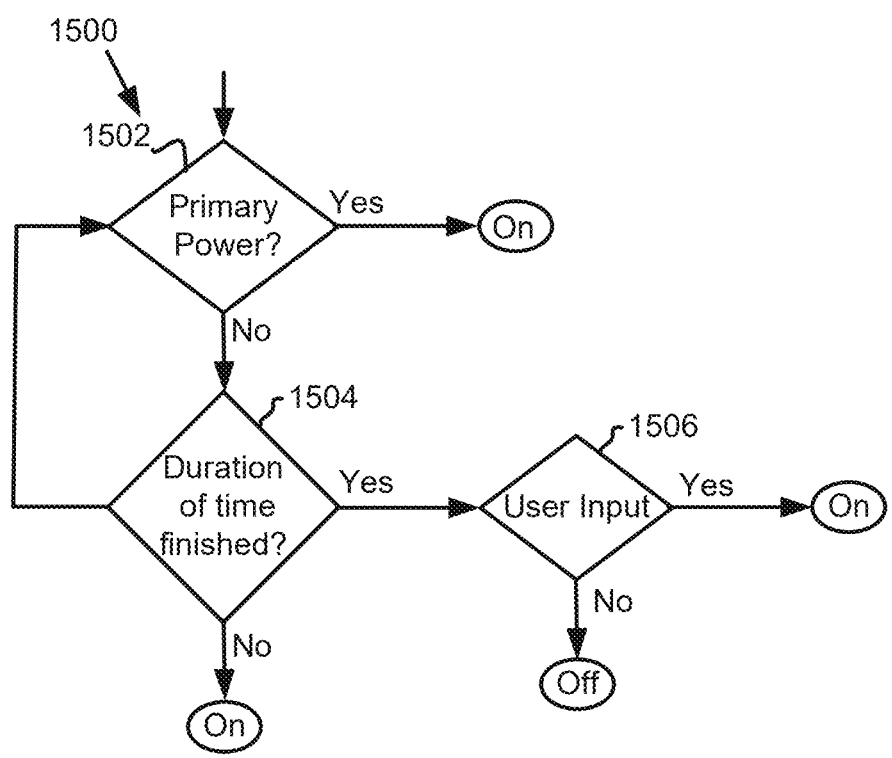

FIG. 15 illustrates a series of decisions 1500 made by the sensor 1102 that determines whether the lightbulb 100 is turned off or allowed to remain on. The first decision is whether the lightbulb 100 is connected to an external power source (step 1502). If the external power source is connected, the lightbulb 100 is turned on. If the external power source is disconnected, a determination is made whether a time period has ended (step 1504). If the time duration has not ended, yet, the lightbulb 100 remains on. If the time duration has ended, then a determination is made whether user input was received indicating that the lightbulb 100 should remain on. If user input was received (e.g., if the user pressed an on button), the lightbulb 100 is turned on or on. If the user input is not received, the lightbulb 100 turns off or fades out. Although in FIG. 15, the steps 1502, 1504 and 1506 are (for simplicity) depicted as being made in series, the decisions of the steps 1502, 1504 and 1506 can be made simultaneously or in a different order.

Figure 16:
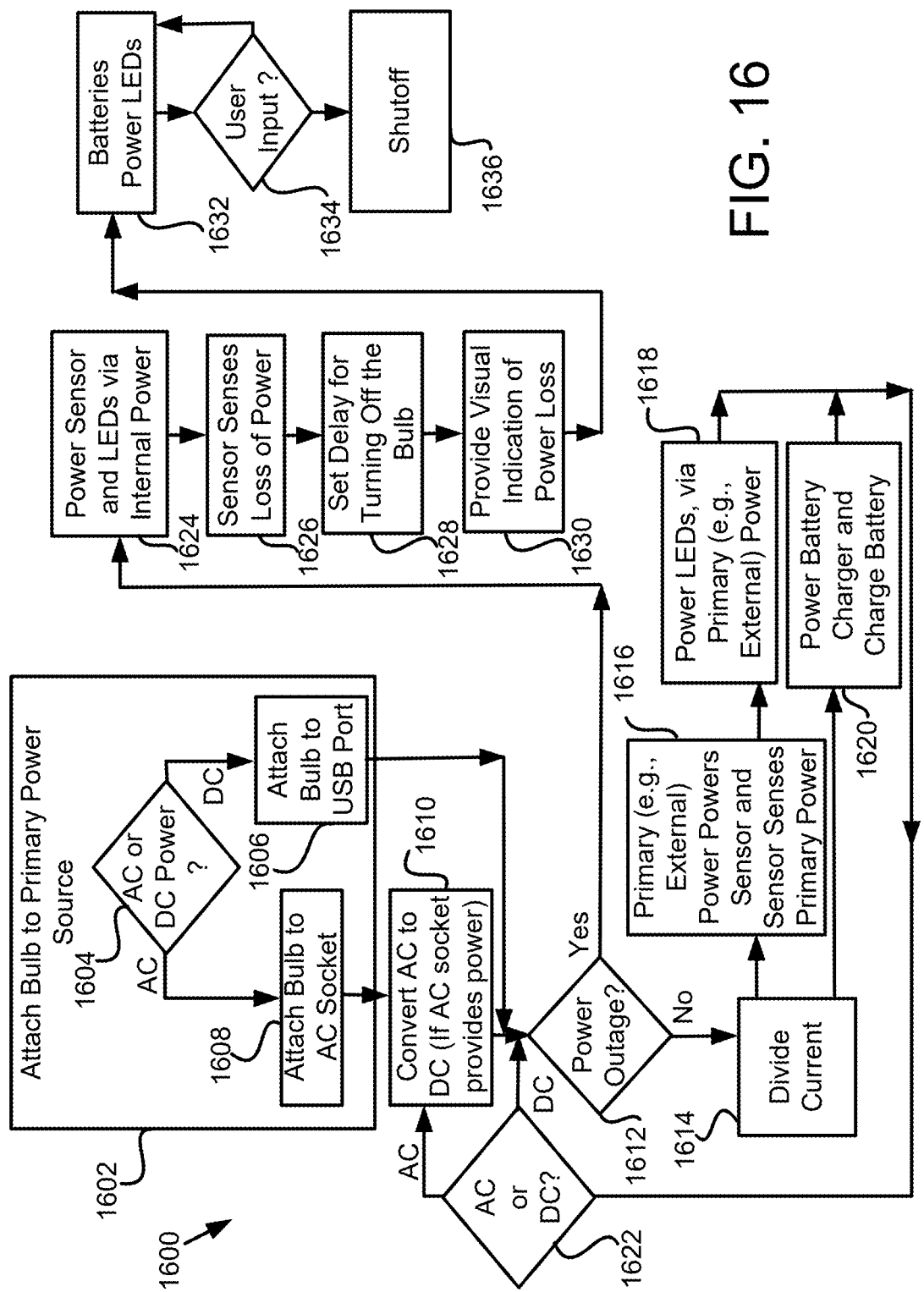
FIG. 16 illustrates various embodiments of a method of using the lightbulb.

FIG. 16 illustrates a flowchart of an embodiment of a method 1600. The lightbulb 100 is connected to a power source (step 1602). Depending on the embodiment, the step 1602 may involve different substeps (e.g., steps 1604-1608). In embodiments in which the lightbulb 100 includes a USB port or a port for another DC power source (in addition to the AC power source), then the user needs to decide whether to plug the lightbulb 100 into an AC power source (e.g., a lightbulb socket) or DC power source (e.g., a USB port)(step 1604). If the user chooses, the user can plug the lightbulb 100 into the USB port (step 1606). If the user decides to use the external source, the user plugs the lightbulb 100 into the AC socket (step 1608), then, if the AC socket has power, the AC to DC converter 1004 converts the AC power from the lightbulb socket to the DC power (step 1610). After either of the steps 1604 or 1610, a determination is made whether there was a power outage (step 1612), and one of two different sets of steps is implemented depending on whether power is supplied externally. If there was no power outage, part of the current is sent towards the battery charger 1006, which the battery charger 1006 uses for charging the batteries 1008 (step 1614). Primary (e.g., External) power is used to power the sensor and the sensor 1102 senses that the power is coming from the primary power (step 1616). Another part of the current is sent initially to the sensor 1102 to determine whether there was a power outage or power loss (step 1616). If there was no power outage and an external power source is present, the current sent to the sensor 1102 continues to power the LED array 1012 (step 1618). The battery charger is powered and the battery is charged. The power from the LED array 1012 returns to the negative reference voltage (LED- or BAT-) (step 1620), and depending upon whether the external power source is connected (e.g., as determined in step 1622), the method returns to either converting AC-to-DC voltage (step 1610) or to determine whether there was a power outage (step 1612. See FIGS. 10-13).

If there was a power outage or if there is no external power (e.g., in step 1612), then the batteries power the LED array 1012 (step 1624), the sensor 1102 senses the loss of power (step 1626), and a delay is set for turning off the lightbulb 100 (step 1628). A visual indication that there was a power loss is provided (step 1630). If the user does not provide input, the LEDs shut off (step 1630).

If there was a power loss, the batteries power the LEDs (step 1632). In some embodiments, a check is performed to see whether any user input was received to prevent the lightbulb 100 from shutting off (step 1634). If user input was received, the timer is turned off or reset (step 1636), and the lightbulb 100 stays on, or its shutoff is delayed. If user input was not received, then, in some embodiments, a determination is made whether the timer has timed out (step 1638). If the timer has not timed out, the method continues to power the LEDs with the batteries (and returns to step 1632). If the timer has timed out, the lightbulb 100 shuts off (step 1640).

Many of the steps of the method 1600 occur continually, in an ongoing manner. For example, steps 1610-1622 occur continually and simultaneously until there is a power outage (or the lightbulb 100 is shut off). Similarly, after a power outage, and before the lightbulb 100 turns off, in some embodiments, steps 1624 and 1630-1638 occur simultaneously and continually.

Figure 17:
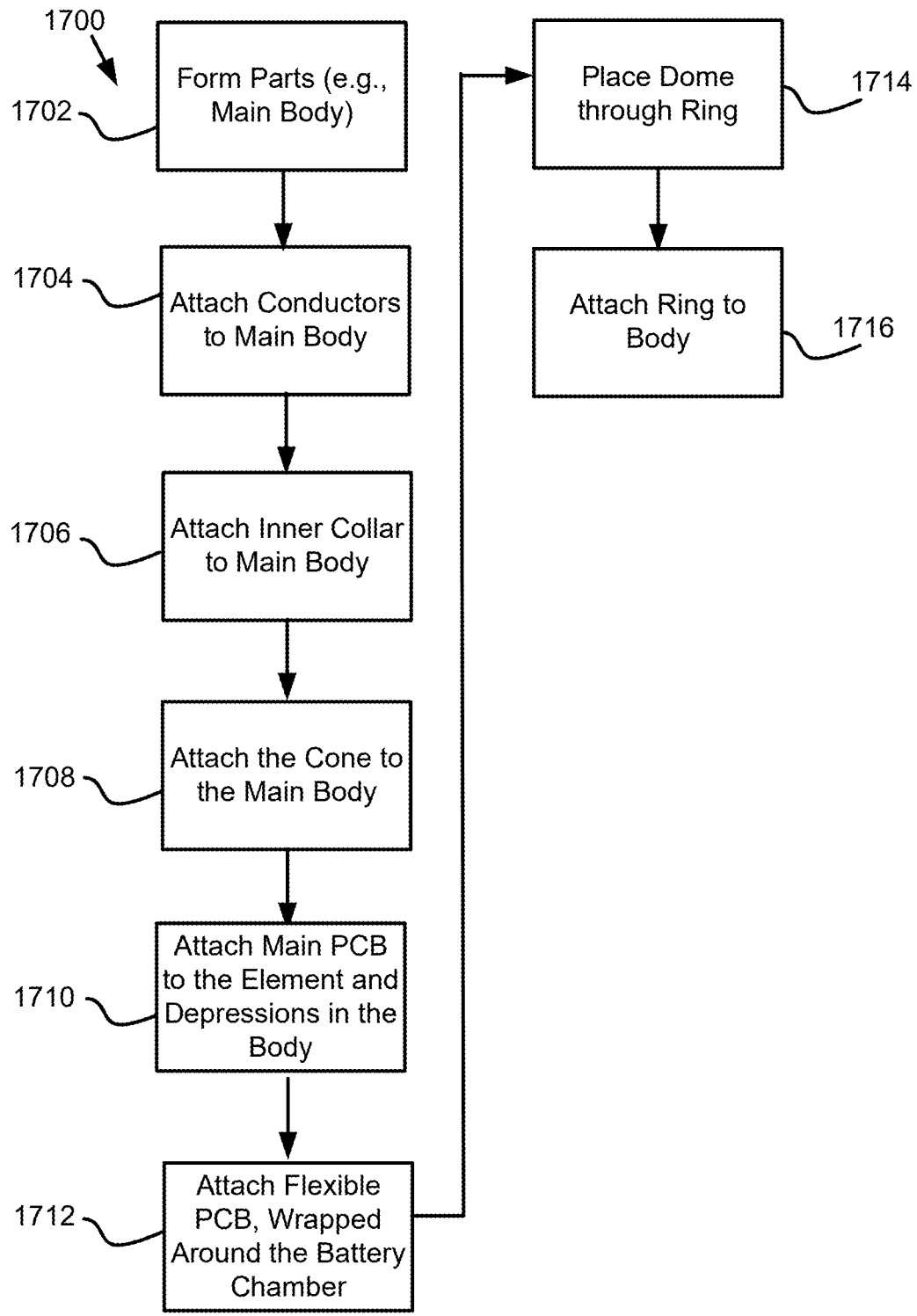
FIG. 17 illustrates various embodiments of a method of constructing the lightbulb.

FIG. 17 illustrates various embodiments of a method 1700 of constructing the lightbulb 100. The various parts of the lightbulb 100 are formed (step 1702). Conductors are attached to the body 110 or 310 (step 1704). The inner collar 202 is attached to the body 110 or 310 (step 1706). The cone 106 and the rest of the lightbulb socket connector are attached to the body 110 or 310 (step 1708). The main PCB 204 is attached the element 206, which are mated with the body 110 or 310 (step 1710). The flexible PCB 402 is attached and wrapped around the exterior of the battery chamber 606 (step 1712). The dome 114 is inserted through the outer collar 208 and the ring 212 (step 1714). The ring 212 is attached in the body 110 or 310. For example, the outer collar 208 is connected to the body 110 or 310 to connect the dome 114 to the body 110 or 310 (step 1716) (see FIG. 2).

Although the specification references PCBs another media containing a circuit can be used instead, For example, the flexible PCB 1014 can replaced with a flexible integrated circuit. Although the above description uses an LED array 404 or 1012 as a light source, another light source can be used instead.

Although the disclosed method and apparatus is described above in terms of various examples of embodiments and implementations, it should be understood that the particular features, embodiments and functionality described in one or more of the individual embodiments are not limited in their applicability to the particular embodiment with which they are described. Thus, the breadth and scope of the claimed invention should not be limited by any of the examples provided in describing the above-disclosed embodiments.

Terms and phrases used in this document, and variations thereof, unless otherwise expressly stated, should be construed as open-ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
a) a lightbulb socket connector for connecting to an AC primary power source, where the AC primary power source is an external power source,
b) an alternating current (AC) to direct current (DC) converter having an AC end connected to the AC primary power source;
c) a light source having a high-voltage end connected to a DC end of the AC-to-DC converter;
d) a DC secondary power source, which is an internal power source having a battery charger connected to the DC end of the AC-to-DC converter; and
e) a battery chamber for holding batteries, being electrically connected to the battery charger and being connected electrically in parallel with the light source;
the light source being powered primarily by the AC primary power source and secondarily by the DC secondary power source, wherein,
(I) the light source is powered primarily by the AC primary power source when the AC primary power source is powered; and
(II) the light source is powered by the DC secondary power source when the AC primary power source is not powered;
f) a sensor for sensing when the AC primary power source is not powered, by sensing that the lightbulb socket connector is not powered; and
g) a controlled switch in communication with the sensor that turns the light source off after a predetermined time after the sensor senses that the lightbulb socket connector is not powered.

2. The system of claim 1, wherein the battery chamber accommodates the batteries, which supply a lower voltage than the DC end of the AC-to-DC converter, causing the light source to be primarily powered by the AC primary power source when the AC primary power source has power.

3. The system of claim 1, the system further comprising:
a manual switch connected to the sensor;
wherein,
when the manual switch is not activated, the sensor causes the light source to automatically turn off after the predetermined time from when the AC primary power source loses power, and
when the manual switch is activated, the sensor causes the light source to remain on.

4. The system of claim 3, further comprising: a light that provides a visual indication of whether the AC primary power source is powered.

5. The system of claim 3, the sensor including a controller that,
   f) determines whether the AC primary power source is powered, and
   g) determines whether the manual switch is activated.

6. The system of claim 1 further comprising: a universal serial bus (USB) in-processing for powering the system.

7. The system of claim 1 further comprising: a universal serial bus USB out-processing connected to the battery chamber, the USB out-processing provides power to an external device.

8. The system of claim 1, wherein the battery chamber is external to the system as a separate unit and the battery chamber is connected electrically to the system using wires.

9. The system of claim 1, wherein the light source includes a flexible material on which lights reside.

10. The system of claim 9, wherein the flexible material is wrapped into a cylindrical shape.

11. The system of claim 9, wherein the flexible material wraps around the battery chamber.

12. The system of claim 11, wherein the flexible material is a printed circuit board.

13. The system of claim 1, wherein the light source includes an array of light-emitting diodes.

14. The system of claim 1, the battery chamber being shaped to hold the batteries, which are cylindrical, the system further comprising a PCB, a hole being located in a center of the PCB, the light source having a cylindrical shape, the light source being positioned with the cylindrical shape surrounding the battery chamber and the battery chamber being located within the cylindrical shape, with the PCB being positioned with the cylindrical shape protruding through the hole in the PCB.

15. The system of claim 1, wherein the light source intensity starts to fade upon sensing that the lightbulb socket connector is not powered.

* * * * *